United States Patent [19]

Hennelly

[11] 3,743,259

[45] July 3, 1973

[54] SPRAY TREATMENT FOR FLAME CUTTING INSTALLATION

[75] Inventor: Robert Hennelly, Decatur, Ill.

[73] Assignee: Caterpillar Tractor Co., Peoria, Ill.

[22] Filed: Aug. 30, 1971

[21] Appl. No.: 175,949

[52] U.S. Cl. .................. 266/23 K, 148/9, 266/23 R
[51] Int. Cl. .............................................. F23j 1/00
[58] Field of Search ..................... 164/69, 70, 263; 165/30, 61; 266/23 R, 23 K; 148/9

[56] References Cited
UNITED STATES PATENTS

| | | | |
|---|---|---|---|
| 3,462,134 | 8/1969 | Michelson | 266/23 K |
| 3,278,999 | 10/1966 | Lemper | 164/263 |
| 3,486,744 | 12/1969 | Beyers et al. | 266/23 R |
| 3,526,395 | 9/1970 | Brown | 266/23 R |

Primary Examiner—Gerald A. Dost
Attorney—Charles M. Fryer et al.

[57] ABSTRACT

A spray treatment for employment in a flame cutting installation fo the type having a flame cutting machine with cutting torches mounted to traverse steel plate stock, an inclined trough beneath the path of the cutting torches, a settling pit at the lower end of the trough, and a pump for recirculating water from the settling pit to the upper end of the trough during the cutting operation in order to establish water flow through the trough which entraps oxide particles and carries away slag to reduce air pollution and facilitate slag removal. The spray treatment is such as to establish a spray upwardly of the trough for more effectively dispersing or purifying the ambient air about the installation.

8 Claims, 3 Drawing Figures

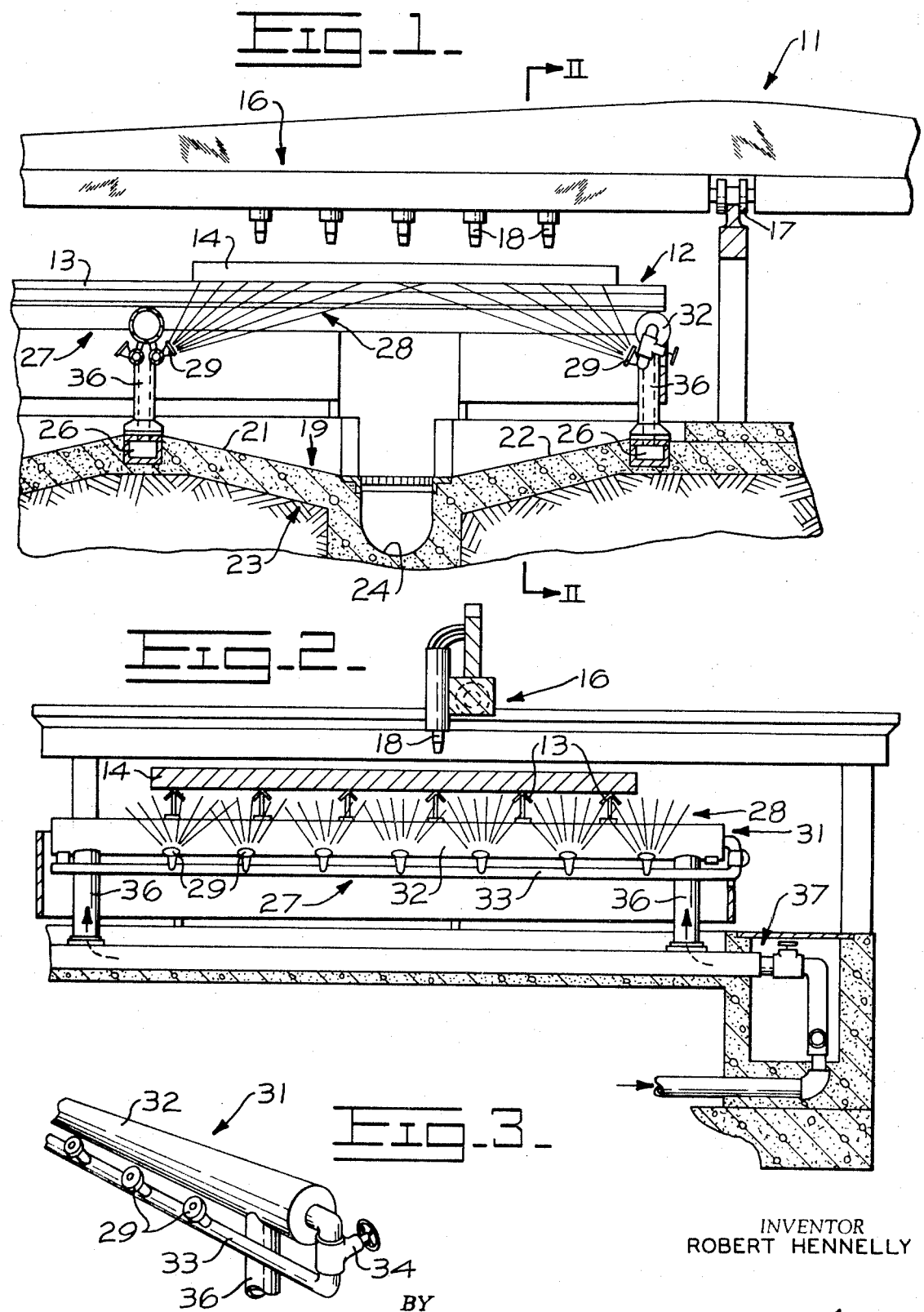

SPRAY TREATMENT FOR FLAME CUTTING INSTALLATION

BACKGROUND OF THE INVENTION

Flame cutting installations with fluid flow waste removal means are known, and in this regard reference may be had to U.S. Pat. No. 3,486,744 which issued Dec. 30, 1969 to Beyers et al., and is assigned to the assignee of the present invention. Basically, in accordance with said patent, an inclined trough is disposed beneath the cutting torches of a flame cutting machine and metal plate stock supported subjacent the torches for cutting into desired shapes. A settling pit is provided at the lower end of the trough and a pump recirculates water from the pit to the upper end of the trough to thereby establish water flow therethrough during the cutting operation. The water flow entraps oxide waste particles and the like evolved by the cutting operation which would otherwise tend to become airborne and pollute the air. Molten metal is also collected in the water flow and converted to slag which together with the oxide particles is carried away to the settling pit. The net result of the fluid flow waste removal means is thus to reduce air pollution and facilitate slag removal.

Although fluid flow waste removal means of the foregoing type are effective to reduce the amount of oxide particles emitted into the air around the flame cutting installation by as much as 85 percent, further improvement in this regard is possible. The substantial space which exists between the stock being cut and the cleansing water flow allows excessive fumes and oxide particles to escape and pollute the ambient air sufficiently to still irritate and occasionally impair the health of workers. A further problem exists in that overheating and distorting of the finished product still occurs despite the cooling of the stock which is facilitated by conversion of molten metal to slag and removal in the water flow through the trough during the cutting process.

SUMMARY OF THE INVENTION

The present invention relates generally to flame cutting installations with waste removal means, and is more particularly directed to a spray treatment arrangement for more effectively dispersing or purifying the ambient air about such an installation.

It is an object of the present invention to provide means of effecting a spray treatment in close proximity beneath a water cleansed open face support table for metal plate stock in a flame cutting installation, which spray saturates the air beneath the stock being cut sufficiently that substantially all undesirable fumes and oxide particles evolved during the cutting operation are filtered from the ambient air.

Another object of the invention is the provision of a spray treatment of the class described in which a portion of the spray impinges on the lower surface of the stock being cut in sufficient volume to afford a substantial cooling effect.

A further object of the invention is to provide a spray treatment of the nature outlined hereinbefore which may be added at nominal cost to existing flame cutting installations with fluid flow waste removal means.

In the accomplishment of the foregoing and other objects and advantages of the invention, a spray treatment arrangement is incorporated in a flame cutting installation which includes an inclined waste removal trough disposed subjacent the spaced-apart rails of an open face support table of a flame cutting machine with cutting torches mounted to traverse plate stock supported upon the rails.

The trough is provided with fluid inlets along its opposite sides and a settling pit is disposed at the lower end of the trough to receive fluid therefrom. A pump recirculates fluid from the pit to the inlets to establish a constant fluid flow through the trough which entraps oxide particles and carries away slag to reduce air pollution and facilitate slag removal during the cutting operation.

A spray treatment arrangement in accordance with the present invention then basically comprises high-pressure water manifolds disposed upwardly from the trough inlets, each manifold having a plurality of nozzles disposed at spaced longitudinal intervals immediately subjacent the rails of the support table. The nozzles are directed to establish a saturating spray subjacent the stock supported on the table to clean the ambient air and provide supplemental cooling for the stock.

BRIEF DESCRIPTION OF THE DRAWING

FIG. 1 is an end view in elevation, with parts in section, of a flame cutting installation embodying the spray treatment of the present invention.

FIG. 2 is a section view taken at line II—II of FIG. 1.

FIG. 3 is a fragmentary perspective view of a manifold and nozzle arrangement of the spray treatment.

DETAILED DESCRIPTION OF THE PREFERRED EMBODIMENT OF THE INVENTION

Referring now to the drawing in detail, particularly FIGS. 1 and 2 thereof, there is shown a flame cutting installation 11 having an open face support table 12 including a plurality of longitudinally spaced transverse support rails 13 for supporting metal stock such as a steel plate 14.

To cut the plate into desired shapes such as strips, a flame cutting machine 16 is mounted for transversal over the plate as by rollers, one of which is shown at 17. The machine has a plurality of flame cutting torches 18 directed downwardly toward the plate to be in cutting intersection therewith during transversal.

In order to collect molten metal which falls downwardly from the plate 14 and iron oxide particles or sparks which tend to be directed downwardly also by the flame from torches 18 during the cutting operation, an inclined trough 19 is provided subjacent the plate 14 and the traversing paths of the torches in a generally conventional manner as disclosed in the previously referenced U.S. Pat. No. 3,486,744.

More particularly, in the present case trough 19 is defined by oppositely transversely inclined floor surfaces 21 and 22 formed directly in the concrete deck 23 and which slope inwardly from the sides of the cutting frame to be joined by a central sluice 24 which slopes downwardly along the length of the cutting frame toward a settling pit (not shown). Conventional waterfall inlet troughs 26 are provided at the opposite sides of trough 19 and along its full length, and pump means (not shown) are provided to recirculate water from the settling pit to the inlet troughs to provide a uniform flow of cooling water across the inclined surfaces 21 and 22, such water flowing down trough 19 to the settling pit.

Surfaces 21 and 22 are sufficiently close to plate 14 that the constant flow of water thereover entraps a substantial portion of the iron oxide particles evolved during the cutting operation before they can escape into the air. Additionally, the quantity of water flowing over surfaces 21 and 22 is sufficient to cool molten metal dropped thereinto during the cutting operation, convert the metal to slag, and carry it to the central sluice 24 from whence it passes to the settling pit. The cooling of the metal by the fluid flow in the immediate vicinity of the plate tends to produce some cooling thereof.

It will be appreciated that the foregoing fluid flow waste removal means as employed in a flame cutting installation is conventional and serves to substantially reduce air pollution in the vicinity of the installation as well as to effect some cooling of the plate being cut in the manner just described. However, the substantial space between plate 14 and trough 19 still allows excessive fumes and oxide particles to escape and pollute the ambient air. In addition, since overheating and distorting of the finished product still occurs, additional supplemental cooling of the plate 14, from which the product is derived, is also desired.

The foregoing problems and disadvantages are obviated in accordance with the present invention by the provision of a spray treatment arrangement, as generally indicated at 27, for providing a spray 28 in close proximity beneath plate 14 to saturate the air thereat sufficiently that substantially all undesirable fumes and oxide particles are filtered from the ambient air. The spray also provides supplemental cooling for the plate being cut by affording a continuous cooling film across the plate's lower surface.

More particularly, the spray treatment arrangement 27 preferably includes respective pluralities of spray nozzles 29 disposed upwardly from inlet troughs 26 immediately subjacent the table support rails 13 at spaced longitudinal intervals. The nozzles are inclined upwardly and inwardly and direct high pressure diverging spray jets therefrom transversely upward toward the plate 14, thereby establishing the spray 28 immediately subjacent the plate with a portion of the spray impinging its lower surface to effect the aforementioned supplemental cooling thereof.

The spray nozzles 29 are advantageously associated with high pressure manifolds 31 in the manner best shown in FIG. 3. Each manifold includes a relatively large diameter supply pipe 32, closed at one end and having a small diameter distribution pipe 33 coaxially communicating with and extending from its opposite end. Pipe 33 is reentrantly turned to extend parallel to pipe 32 along its entire length and is plugged at its free end while having a valve 34 in the reentrantly turned portion thereof. Nozzles 29 are communicated with distribution pipe 33 at spaced longitudinal intervals with the previously noted inclined orientations.

In order to introduce water to each manifold 31, parallel inlet pipes 36 are radially communicated with supply pipe 32 adjacent its opposite ends. Pipes 36 also serve to mount the manifold supply pipes 32 in directly overlying parallel relation to inlet troughs 26. In this regard, pipes 36 are secured to the troughs and project vertically upward therefrom to thereby support pipes 32 in longitudinal positions overlying the troughs.

The distribution pipes 33 are located inwardly of the supply pipes 32 to dispose the nozzles 29 in the previously discussed positions. Pipes 36 are communicated with conventional plumbing, as indicated at 37, for supplying water to pipes 32. The valves 34 are then employed to regulate the water flow to distribution pipes 33, and thus the intensity of the spray directed from the nozzles 29. In this manner the spray 28 is established to cool the plate 14 and saturate oxide particles, such saturated particles then dropping into trough 19 for removal by the water flowing therein.

Although the invention has been hereinbefore described and illustrated in the accompanying drawing with respect to a preferred embodiment, it will be appreciated that numerous variations and changes may be made therein without departing from the true spirit and scope of the invention, and thus it is not intended to limit the invention except by the terms of the appended claims.

What is claimed is:

1. In a flame cutting installation including an open face support table having spaced-apart rails for supporting metal plate stock thereon, a flame cutting machine with cutting torches mounted to traverse said plate stock, a fluid flow waste removal trough disposed subjacent said rails beneath the path of said cutting torches, and means for establishing fluid flow through said trough the improvement comprising means for establishing a direct fluid spray upwardly of said trough in close proximity beneath said rails to saturate the ambient air thereat and filter undesirable fumes and oxide particles therefrom.

2. The installation of claim 1, wherein the spray means are disposed to impinge a portion of said spray on the lower surface of stock supported on said rails and establish a continuous cooling film across said lower surface.

3. The installation of claim 1, further defined by said trough having fluid inlets along the entire lengths of its opposite sides, and the spray means comprising respective pluralities of spray nozzles disposed upwardly from said inlets immediately subjacent said rails at spaced longitudinal intervals, said nozzles being inclined upwardly and inwardly to direct diverging spray jets therefrom toward stock supported on said rails.

4. The installation of claim 3, wherein said nozzles are communicated with a pair of high pressure manifolds respectively mounted immediately subjacent said rails in longitudinally extending parallel overlying relation to said inlets.

5. The installation of claim 4, wherein each of said manifolds comprises a relatively large diameter supply pipe having one end closed and a small diameter distribution pipe coaxially communicating with and extending from its opposite end, said distribution pipe being reentrantly turned to extend parallel to said supply pipe along the entire length thereof, said distribution pipe being closed at its free end, said nozzles communicating with said distribution pipe at spaced longitudinal intervals thereof, and means for supplying water to said supply pipe.

6. The installation of claim 5, further defined by a valve in the reentrantly turned portion of said distribution pipe for regulating flow therein to thereby regulate the intensity of spray directed from said nozzles.

7. The installation of claim 5, further defined by the water supply means comprising a pair of inlet pipes communicating with the opposite ends of said supply pipe, said inlet pipes to said supply pipes depending therefrom and being secured to said inlets of said trough to support said supply pipes in directly overlying parallel relation to said inlets with said distribution pipes inwardly disposed from said supply pipes, and plumbing means communicated with said inlet pipes for supplying water thereto.

8. The installation of claim 7, further defined by a valve in the reentrantly turned portion of each of said distribution pipes for regulating flow therein to thereby regulate the intensity of spray directed from said nozzles.

* * * * *